(12) United States Patent
Lainet et al.

(10) Patent No.: US 7,383,703 B2
(45) Date of Patent: Jun. 10, 2008

(54) ANTI-PMD SYSTEM FOR OPTICAL FIBERS

(75) Inventors: Eric Lainet, Maisons Laffitte (FR); Kamel Dougdag, Andresy (FR); Jean-François Bourhis, Taverny (FR)

(73) Assignee: Draka Comteq B.V., Amsterdam (NL)

( * ) Notice: Subject to any disclaimer, the term of this patent is extended or adjusted under 35 U.S.C. 154(b) by 495 days.

(21) Appl. No.: 10/649,720

(22) Filed: Aug. 28, 2003

(65) Prior Publication Data

US 2004/0045324 A1 Mar. 11, 2004

(30) Foreign Application Priority Data

Sep. 9, 2002 (FR) .................................. 02 11128

(51) Int. Cl.
*C03B 37/00* (2006.01)
(52) U.S. Cl. .......................................... 65/504; 65/402
(58) Field of Classification Search .................. 65/535, 65/533, 402, 438, 504, 436, 475, 486
See application file for complete search history.

(56) References Cited

U.S. PATENT DOCUMENTS 5,678,903 A * 10/1997 Batelaan ..................... 305/167
6,324,872 B1 12/2001 Blaszyk et al.
6,629,735 B1 * 10/2003 Galy .......................... 301/5.307
2001/0020374 A1 * 9/2001 Roba et al. .................... 65/402
2004/0003628 A1 * 1/2004 Shimazu et al. ............... 65/402

FOREIGN PATENT DOCUMENTS

| EP | 0744636 A2 | 11/1996 |
|---|---|---|
| JP | 06239642 | 8/1994 |
| JP | 2000344539 | 12/2000 |
| JP | 2001048568 | 2/2001 |
| JP | 2001302272 | 10/2001 |

OTHER PUBLICATIONS

Machine Translation of JP 2001-048568 obtained Jun. 2, 2006 from the Industrial Property Digital Library □□Tsurusaki et al., Method and Apparatus for Producing Optical Fiber, Feb. 20, 2001.*

* cited by examiner

*Primary Examiner*—Steven P. Griffin
*Assistant Examiner*—Queenie Dehghan
(74) *Attorney, Agent, or Firm*—Sughrue Mion, PLLC

(57) ABSTRACT

An anti-PMD system comprises a pulley which oscillates in rotation and applies a torsion torque alternately in the clockwise direction and in the counterclockwise direction to an optical fiber during drawing of the optical fiber to reduce its PMD. A portion of a peripheral external surface of the pulley intended to be in contact with the optical fiber during drawing is convex.

9 Claims, 2 Drawing Sheets

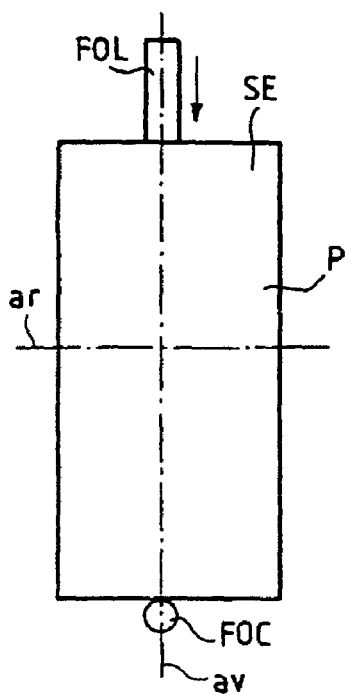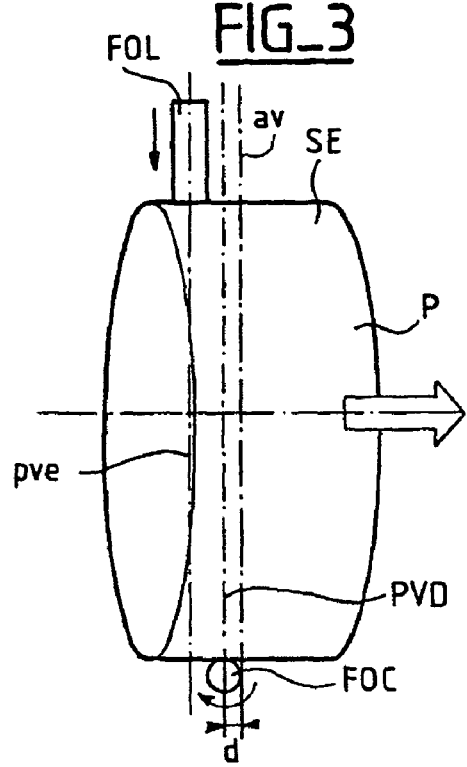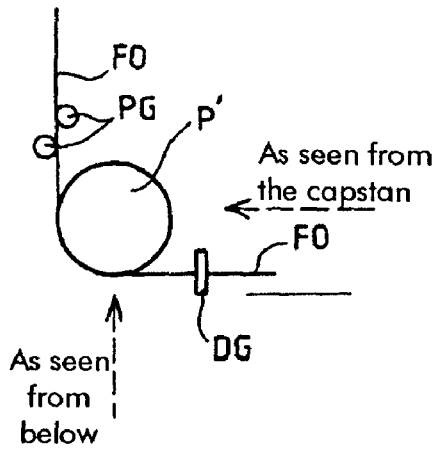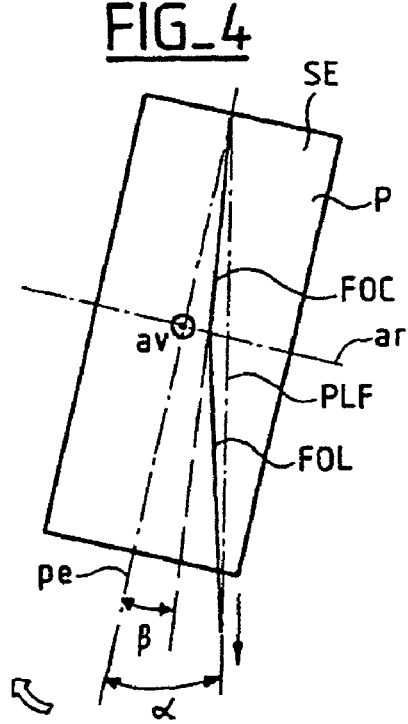

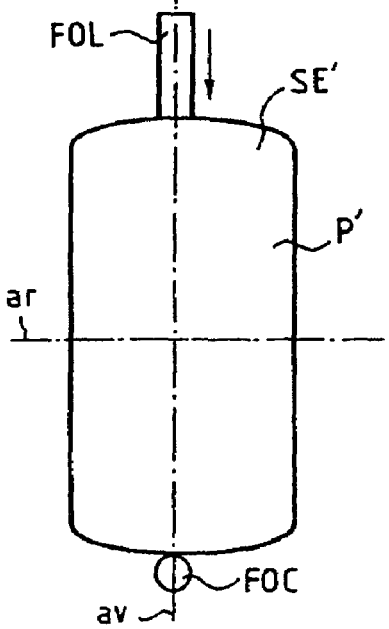
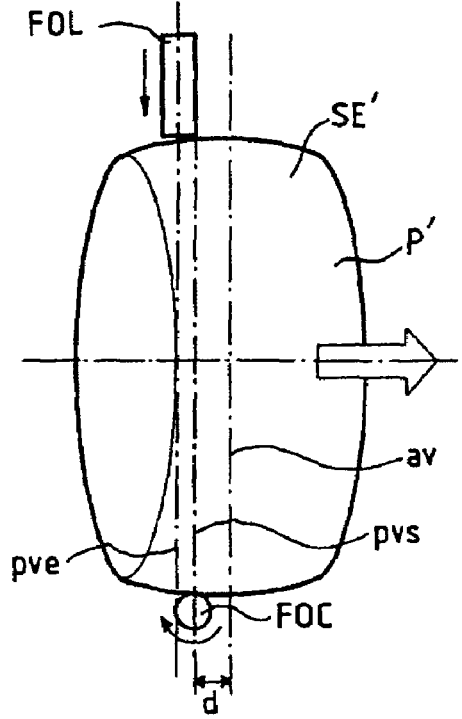
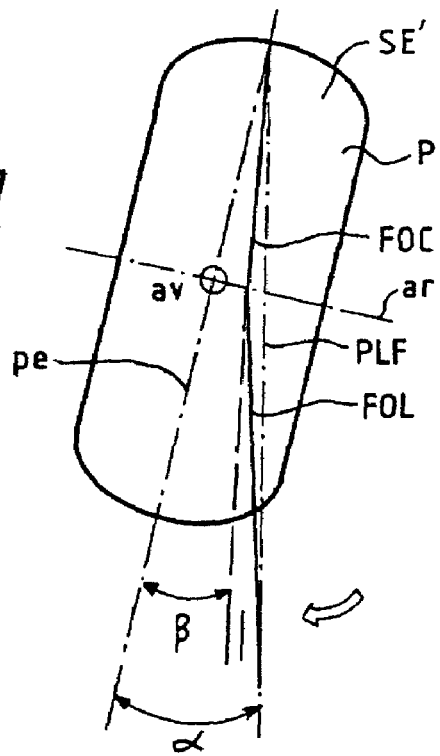

ANTI-PMD SYSTEM FOR OPTICAL FIBERS

CROSS-REFERENCE TO RELATED APPLICATIONS

This application is based on French Patent Application No. 02 11 128 filed Sep. 9, 2002, the disclosure of which is hereby incorporated by reference thereto in its entirety, and the priority of which is hereby claimed under 35 U.S.C. § 119.

BACKGROUND OF THE INVENTION

1. Field of the Invention

The field of the invention is that of anti-PMD systems, the purpose of which is to reduce the polarization mode dispersion (PMD) of an optical fiber during the fiber drawing process. PMD is a problem in an optical fiber because it degrades the signal propagating in the optical fiber. This problem is becoming increasingly severe as the bit rates in optical fiber communication networks increase.

2. Description of the Prior Art

A prior art anti-PMD system known as the SZ system is based on the use of a flat pulley oscillating in rotation. It is described in U.S. Pat. No. 5,298,047, for example, herein incorporated by reference, and in European patent EP 744636. The SZ system includes a flat pulley. A flat pulley is one whose peripheral external surface is cylindrical. The SZ system is positioned at the base of the fiber drawing tower, in the plane through which the optical fiber passes, the optical fiber executing an elbow bend at the flat pulley. The plane through which the optical fiber passes is also known as the fiber drawing plane. The flat pulley, rotating about its rotation axis, also oscillates about the vertical fiber drawing axis, which is coincident with its oscillation axis, and symmetrically with respect to the fiber drawing plane. V-shaped pulleys upstream of the oscillating flat pulley and guide fingers downstream of the oscillating flat pulley guide the optical fiber in the fiber drawing plane. Oscillations of the pulley, alternately from right to left and then from left to right, apply a torsion torque to the optical fiber, which is already covered with its secondary coating. A drawback of this prior art system is that it produces optical fibers whose PMD is still too high.

The invention proposes an improved anti-PMD system which further reduces the PMD of optical fibers during fiber drawing. To this end, the invention proposes an anti-PMD system based on using a pulley oscillating in rotation and which is convex in order to increase the ratio between, firstly, the angle between the optical fiber in contact with the pulley and the normal to the rotational axis and to the oscillation axis of the pulley and, secondly, the angle between the optical fiber drawing plane and the normal to the rotation axis and to the oscillation axis of the pulley, to increase the torsion torque applied to the optical fiber to reduce the PMD of the optical fiber. If the ratio between, firstly, the angle between the optical fiber in contact with the pulley and the normal to the rotation axis and the oscillation axis of the pulley and, secondly, the ratio between the optical fiber drawing plane and the normal to the rotation axis and the oscillation axis of the pulley increases, for a given amplitude of oscillation of the pulley, the angle between the optical fiber in contact with the pulley and the normal to the rotation axis and the oscillation axis of the pulley increases, which causes the optical fiber to twist more, thereby increasing the torsion torque applied to the optical fiber.

SUMMARY OF THE INVENTION

The invention provides an anti-PMD system comprising a pulley adapted to oscillate in rotation and to apply a torsion torque alternately in the clockwise direction and in the counterclockwise direction to an optical fiber during drawing of the optical fiber to reduce its PMD, in which system a portion of a peripheral external surface of the pulley intended to be in contact with the optical fiber during drawing is convex.

The invention also provides the convex pulley itself, to the degree that said pulley is intended to be used in an anti-PMD system for optical fibers, and where applicable with the optional advantageous features described hereinafter.

The invention will be better understood and other features and advantages will become apparent in the light of the following description and the appended drawings, which are provided by way of example only.

BRIEF DESCRIPTION OF THE DRAWINGS

FIG. 1 shows diagrammatically a portion of a fiber drawing system for drawing an optical fiber from a preform.

FIGS. 2 to 4 are diagrams explaining how the PMD of optical fibers is reduced in a prior art anti-PMD system.

FIGS. 5 to 7 are diagrams showing how the PMD of optical fibers is reduced in an anti-PMD system according to the invention.

DETAILED DESCRIPTION OF THE PREFERRED EMBODIMENT

FIG. 1 shows diagrammatically a portion of a fiber drawing system for drawing an optical fiber from a preform, which portion incorporates an anti-PMD system according to the invention. FIG. 1 shows the fiber drawing system portion at the bottom of the fiber drawing tower. The optical fiber FO, which has already received its two coatings, moves in the direction of the continuous line arrows. While still moving vertically, the optical fiber FO is guided by guide pulleys PG. The optical fiber FO then changes direction on passing over the oscillating pulley P'. On leaving the oscillating pulley P', the optical fiber FO is moving horizontally and is guided by guide fingers DG. The capstan, not shown in FIG. 1 for reasons of simplicity, is situated downstream of the guide fingers DG. Dashed line arrows show the various views used in the subsequent figures.

The various steps of fabricating the optical fiber during the fiber drawing process have a strong influence on the index out of round and the geometry out of round of the core of the preform and consequently also of the optical fiber, which are one cause of high PMD. Optical fibers whose PMD is too high cannot be sold because their PMD would degrade excessively the optical signal transmitted by the optical fiber. The method used to reduce the PMD of an optical fiber during fiber drawing consists in causing the optical fiber to twist, alternately in one rotation direction, for example the clockwise direction, and then in the other rotation direction, for example the counterclockwise direction. The anti-PMD system at the base of the fiber drawing tower, which twists the optical fiber, preferably operates on the optical fiber covered with its two coatings. The torsion torque applied to the optical fiber is transmitted to the viscous glass cone of the preform, situated in the fiber drawing furnace, several meters above the anti-PMD system. The "soft" and twisted glass that is drawn toward the bottom of the fiber drawing tower by the traction of the capstan is then rapidly cooled (this is referred to in the art as "quenching"), which fixes in the glass the torsion exerted by the anti-PMD system. Within reasonable limits, the more the optical fiber is twisted, alternately in one direction and then the other, the lower, and therefore the better, the PMD of the optical fiber. The PMD associated with the index out of round (core index out of round in the plane perpendicular to the light transmission axis) can be corrected by twisting the optical fiber, as can the geometrical out of round. On the other hand, a PMD related to a defect in the glass or to an index variation on the longitudinal axis of the optical fiber would not be modified by the anti-PMD system.

FIGS. 2 to 4 are diagrams explaining how the PMD of optical fibers is reduced in a prior art anti-PMD system. FIGS. 5 to 7 are diagrams explaining how the PMD of optical fibers is reduced in an anti-PMD system according to the invention. FIGS. 2 and 5 are side views of the pulley parallel to the fiber drawing plane and as seen from the capstan. FIGS. 3 and 6 respectively show the pulley from FIGS. 2 and 5 but when oscillating and as seen from the capstan. FIGS. 4 and 7 respectively show the pulley from FIGS. 2 and 5 but when oscillating and as seen from underneath the pulley. The direction of movement of the optical fiber is indicated by narrow straight arrows. The direction of oscillation of the pulley is indicated by wide arrows. The direction of rolling of the optical fiber on the pulley is indicated by narrow curved arrows. The pulley oscillating in rotation is denoted P when it is flat, as in FIGS. 2 to 4, and P' when it is convex, as in FIGS. 5 to 7. The peripheral external surface SE of the flat pulley P is cylindrical. The peripheral external surface SE' of the convex pulley P' is toroidal. The optical fiber has portions FOL free of contact with the pulley P or P' and portions FOC in contact with the pulley P or P'. The pulley P or P' rotates about a rotation axis ar. The pulley P or P' oscillates about a vertical oscillation axis av. The normal to the rotation axis ar and the oscillation axis ao is denoted pe. When the pulley P or P' oscillates, the optical fiber upstream of the pulley P or P' arrives at the pulley P or P' at a vertical entry position pve and leaves the pulley P or P' at a vertical exit position pvs. The horizontal offset between the vertical exit position pvs and the vertical axis av is denoted d. The fiber drawing plane is denoted PLF. The angle β is the angle between, firstly, the normal pe to the rotation axis ar and the vertical oscillation axis av and, secondly, the optical fiber portion FOC in contact with the pulley P or P'. The angle α is the angle between, firstly, the normal pe to the rotation axis ar and the vertical oscillation axis av and, secondly, the fiber drawing plane PLF. The angle α is representative of the amplitude of the oscillations of the oscillating pulley P or P'. The offset d and the angle β are representative of the offset of the optical fiber from its equilibrium position, and thus of the effect of the oscillations of the pulley P or P' on the optical fiber, and therefore of the effectiveness of the anti-PMD treatment applied to the optical fiber by the oscillating pulley P or P'. The angle β of the convex pulley P' of FIG. 7 is substantially greater than the angle β of the first pulley P of FIG. 4.

The pulley P or P' oscillates about the vertical oscillation axis av. At the entry to the oscillating pulley P or P', the area of contact between the optical fiber and the pulley P or P' has only a very slight influence on the torsion torque exerted on the optical fiber. The action of the oscillating pulley P or P' on the optical fiber is essentially localized between the middle of the contact area FOC between the optical fiber and the oscillating pulley P or P', on the one hand, and the exit from the oscillating pulley P or P', on the other hand. During fiber drawing, the oscillating pulley P or P' turns about its rotation axis ar because it is driven by the optical fiber, which is moving. When the pulley P or P' oscillates, as in FIGS. 3 and 6, the pulley P or P' exerts a torsion torque on the optical fiber. This torsion torque accounts for most of the twisting of the optical fiber. The greater the amplitude of the oscillation of the pulley P or P', the greater the torque exerted by the pulley P or P', and the more the optical fiber is twisted. Considering the ideal case in which the optical fiber rolls without slipping on the pulley P or P', for a given angular amplitude α of the oscillation of the pulley P or P', in the case of the flat pulley P, the offset d and the angle β remain relatively low, whereas they become substantially greater in the case of the convex pulley P', because the optical fiber, no longer being in contact with a flat surface, but instead with a convex surface, moves away more easily from its equilibrium position. At a high fiber drawing rate, the previous results remain valid but their explanation is more complex because of slipping and vibration of the optical fiber. Slipping remains of very limited extent, even at high fiber drawing speeds. It is mostly the vibration that becomes important.

The anti-PMD system according to the invention is no more complicated than the prior art SZ anti-PMD system, which is well known and proven; modifying just one component, namely the oscillating pulley, implements the method according to the invention and significantly improves results in terms of the optical fiber PMD obtained. It is also possible, for an equivalent optical fiber PMD obtained by maintaining the value of the torsion torque applied to the optical fiber, to reduce significantly the angle of oscillation of the oscillating pulley, in order to improve the quality of the coating of the optical fiber. In contrast to what might have been expected a priori, the complex character of the pulley does not significantly increase optical fiber coating defects compared to a flat pulley. The effectiveness of a flat oscillating pulley being an increasing function of its diameter, it is possible to obtain the same result in terms of the optical fiber PMD obtained with a convex pulley of relatively smaller diameter as with a flat pulley of relatively greater diameter.

Ranges of preferred values for the radius of the pulley and for the radius of curvature of its convex surface for obtaining the lowest possible PMD of the optical fiber are now specified. Let R be the radius of the pulley and r the radius of curvature of the convex portion of the peripheral external surface of the pulley.

The ratio r/R is preferably from ½ to 1. The ratio r/R can be from ¼ to ½ when the radius R of the pulley is greater than 50 mm and when the amplitude of the oscillations is advantageously also limited to a few degrees on either side of the vertical position of the pulley. Below a particular radius of curvature r, the risk of the optical fiber jumping off the pulley is no longer negligible and problems can arise, as much with respect to defective coating of the optical fiber as with respect to defective alignment of the pulley. If the radius R of the pulley is less than 50 mm, the ratio r/R can also be from 1 to 2. Beyond a particular radius of curvature r, the improvement obtained from a convex pulley compared to a flat pulley becomes of increasingly little benefit.

The radius of curvature r of the convex portion of the peripheral external surface of the pulley is preferably constant over the whole of the convex portion of the peripheral external surface of the pulley, i.e. a section through the pulley in a plane of symmetry passing through the rotation axis of the pulley yields a trace of the peripheral external surface that is preferably circular rather than elliptical or conical or some other shape. The prior art pulley is referred to as flat because a section through the pulley in a plane of symmetry passing through the rotation axis of the pulley gives a rectilinear trace of the peripheral external surface. It is preferable if the whole of the peripheral external surface of the pulley is convex, not only its portion intended to be in contact with the optical fiber.

The radius R of the pulley is preferably less than or equal to 100 mm, because beyond this radius the pulley becomes bulky and the improvement in terms of the optical fiber PMD obtained compared to a flat pulley is of less benefit. The radius R of the pulley is preferably greater than or equal to 25 mm in order to prevent the optical fiber jumping off the pulley and escaping from the peripheral external surface of the pulley.

Moreover, a pulley whose peripheral external surface is too wide is of little benefit in that a great portion of the peripheral external surface of the pulley is then not in contact with the optical fiber and is therefore of no utility. The peripheral external surface of the pulley is preferably as regular and as smooth as possible, since asperities could damage the optical fiber coating.

For the same width of oscillating pulley, the greater the radius R of the oscillating pulley, the greater its travel and the greater the risk of the optical fiber jumping off the pulley. The convex oscillating pulley according to the invention allows the use of a pulley of smaller radius for an equivalent result in terms of the optical fiber PMD obtained, with the result that there is no need for guide rims on the convex pulley according to the invention. The convex pulley according to the invention preferably has no guide rims. The oscillations of the pulley advantageously have an angular amplitude that is sufficiently small for the optical fiber not to jump off the pulley despite the absence of guide rims on the pulley.

In the following numerical example, a prior art flat pulley with a radius of 76.5 mm is compared to a convex pulley according to the invention with the same radius and a constant radius of curvature also equal to 76.5 mm. Identical oscillation conditions, expressed in Hertz for the frequency and in degrees for the amplitude, are applied to the two pulleys. The parameter given in the boxes of the following table is the twisting of the optical fiber in turns per meter, which is directly related to the PMD reduction obtained (the higher the number of turns per meter for the twist, the lower the PMD value obtained or, to be more precise, the greater the proportion of heterogeneous core geometry preforms nevertheless yielding low values of PMD in a given population of preforms).

TABLE

| Oscillation conditions | Flat pulley | Convex pulley |
| --- | --- | --- |
| 4.5 Hz & ±4° | 0.2 | 2.6 |
| 4.5 Hz & ±6° | 3.0 | 6.7 |
| 4.5 Hz & ±8° | 6.4 | 11.9 |

The improvement resulting from the convex peripheral external surface of the pulley is clear from the values in the above table.

There is claimed:

1. An anti-PMD system comprising:
   an optical fiber being drawn;
   a pulley having an outermost peripheral external surface over which the optical fiber rolls during the drawing of the optical fiber, said pulley being rotatable so as to oscillate in rotation and to apply a torsion torque alternately in the clockwise direction and in the counterclockwise direction to the optical fiber during drawing of said optical fiber to reduce its PMD, wherein the outermost peripheral external surface of said pulley in contact with said optical fiber during drawing is toroidal, convex surface.

2. The anti-PMD system claimed in claim 1 wherein a ratio r/R of a radius r of curvature of the convex portion of said peripheral external surface of said pulley to a radius R of the pulley is in the range of ½ to 1.

3. The anti-PMD system claimed in claim 1 wherein a ratio r/R of a radius r of curvature of the convex portion of said peripheral external surface of said pulley to a radius R of the pulley is in the range of ¼ to ½ when R is greater than 50 mm.

4. The anti-PMD system claimed in claim 1 wherein a ratio r/R of a radius r of curvature of the convex portion of said peripheral external surface of said pulley to a radius R of the pulley is in the range of 1 to 2 when R is less than 50 mm.

5. The anti-PMD system claimed in claim 1 wherein the radius of curvature of the convex portion of said peripheral external surface of said pulley is constant over the whole of said convex portion of said peripheral external surface of said pulley.

6. The anti-PMD system claimed in claim 1 wherein all of said peripheral external surface of said pulley is convex.

7. The anti-PMD system claimed in claim 1 wherein the radius of said pulley is less than or equal to 100 mm.

8. The anti-PMD system claimed in claim 1 wherein the radius of said pulley is greater than or equal to 25 mm.

9. The anti-PMD system claimed in claim 1 wherein said pulley has no guide rims.

* * * * *